(12) United States Patent
Dinsch et al.

(10) Patent No.: US 6,563,007 B2
(45) Date of Patent: May 13, 2003

(54) PREPARATION OF POLYETHEROLS

(75) Inventors: Stefan Dinsch, Schipkau (DE); Jürgen Winkler, Schwarzheide (DE); Gottfried Knorr, Schwarzheide (DE); Michael Reichelt, Ruhland (DE); Gerd Höppner, Schwarzheide (DE); Peter von Malotki, Lemförde (DE)

(73) Assignee: BASF Atiengesellschaft, Ludwigshafen (DE)

( * ) Notice: Subject to any disclaimer, the term of this patent is extended or adjusted under 35 U.S.C. 154(b) by 0 days.

(21) Appl. No.: 09/915,601

(22) Filed: Jul. 26, 2001

(65) Prior Publication Data

US 2002/0147369 A1 Oct. 10, 2002

(30) Foreign Application Priority Data

Jul. 28, 2000 (DE) .......................... 100 37 120
Jun. 29, 2001 (DE) .......................... 101 31 427

(51) Int. Cl.$^7$ .......................... C07C 27/00; C07C 41/00; C08L 75/00; C08J 5/14; C03C 8/14
(52) U.S. Cl. .......................... 568/679; 568/866; 568/867; 521/137; 521/155; 521/159; 521/170; 521/174; 521/914
(58) Field of Search .......................... 521/137, 155, 521/159, 170, 174, 914; 568/866, 867, 679

(56) References Cited

U.S. PATENT DOCUMENTS 5,925,687 A * 7/1999 Guettes et al. .............. 521/137
6,087,409 A * 7/2000 Naber et al. ................ 521/155

* cited by examiner

*Primary Examiner*—Samuel Barts
*Assistant Examiner*—Sikarl A. Witherspoon
(74) *Attorney, Agent, or Firm*—Fernando A. Borrego; Mary K. Cameron

(57) ABSTRACT

Polyetherols based on solid initiator substances and liquid, hydroxyl-containing coinitiators are prepared by a catalyzed addition reaction of alkylene oxides by a process in which the initiator combination contains diols carrying ethoxy structures, the ratio of the average number of hydroxyl groups per mole of initiator combination to the number of ethoxy structures in the polyetherol being from 1:0.2 to 1:1.8 and the ratio of the amounts by weight of the diols carrying ethoxy structures to the average molecular weight of the polyetherol being from 1:2 to 1:15. The polyetherols prepared by this process are used for the preparation of PUR, in particular, rigid PUR foams.

8 Claims, No Drawings

PREPARATION OF POLYETHEROLS

The present invention relates to a process for the preparation of polyetherols based on solid initiator substances and liquid, hydroxyl-containing coinitiators by a catalyzed addition reaction of alkylene oxides and to the use of these polyetherpolyols for the preparation of polyurethanes (PUR), in particular rigid PUR foams.

The preparation of polyetherols by anionic polymerization has long been known.

Further details in this context appear, for example, in Kunststoffhandbuch, Volume VII, Polyurethane, Carl-Hanser-Verlag, Munich, $1^{st}$ Edition 1966, edited by Dr. R. Vieweg and Dr. A. Höchtlen, and $2^{nd}$ Edition 1983 and $3^{rd}$ Edition 1993, edited by Dr. G. Oertel.

Use of, for example, mono-, di- or polysaccharides and further compounds having a high functionality in the preparation of polyetherols having a high functionality for rigid PUR foams has been widely described. When substances having a high content of hydroxyl groups, for example sucrose, are used, the problem of the reaction of solid substances with alkylene oxides in a pressure autoclave occurs. Moroever, the use of high temperatures during the alkoxylation reaction is limited. Thus, dark products which are undesirable in numerous applications are formed in the reaction of sucrose with alkylene oxides at above 120° C.

A process for the alkoxylation of solid initiator substances, e.g. pentaerythritol, dipentaerythritol, trimethylolpropane, sorbitol or sucrose, is described in U.S. Pat. No. 3,346,557. There, the initiator substance containing from 3 to 8 OH groups per mole is mixed with an amine catalyst and is alkoxylated to give an adduct consisting of a usually solid compound containing from 3 to 8 OH groups per mole, and from 0.5 to 1.5 mol of vicinal alkylene oxide. For example, sucrose, tributylamine and distilled water are mixed and propoxylated. This adduct is stripped, mixed with tributylamine and further propoxylated. The sucrose/propylene oxide adduct serves as a reaction medium for taking up further sucrose during further reaction with alkylene oxides.

However, it has been found that dark products are formed throughout as a result of the long thermal stress in the course of the reaction. The introduction of sucrose into an alkoxylate and further alkoxylation of this mixture furthermore often leads to incomplete conversion of the sucrose added. Free sucrose is present in the polyetherol and is deposited on the bottom. This effect is very highly dependent on the degree of alkoxylation and on the technical equipment of the production plant. As a result of the amine catalysis, these polyetherols have high intrinsic reactivities which adversely affect the curing of the foams and greatly limit their use.

DD-A-211797 describes a process for the stepwise preparation of polyetherols using solid or highly viscous initiator substances in combination with substances which have a combined function as catalyst and coinitiator, for example ammonia and/or its propoxylation products. For example, aqueous ammonia solution, aqueous potassium hydroxide solution and sucrose are mixed and are propoxylated in a first reaction stage. The product is stripped and reacted with further propylene oxide. The incorporation of nitrogen-containing compounds leads to reductions in viscosity with comparable functionality but also to an increase in the intrinsic reactivity of the polyetherol and hence to a deterioration in the curing behavior. The functionality of the polyetherols is also greatly reduced by the high water contents of the solutions of nitrogen-containing compounds. These polyetherols cannot be used for many rigid foam applications. The required distillation step furthermore leads to a poor yield of the raw materials used. Furthermore, the wastewater is polluted necessitating further technical measures.

The process described in DE-A-4209358 for the preparation of polyether alcohols based on solid and highly viscous initiator substances having hydroxyl, imino or amino functional groups comprises adding aliphatic amines in an amount from 0.5 to 5% by weight, based on the weight of the polyol, to the initiator substance or mixture of initiator substances and then carrying out a reaction with alkylene oxides. These polyols have low potassium contents and light colors. In this process, too, the amine content of the polyol results in a higher intrinsic reactivity with respect to isocyanates, which necessitates a decrease in the amount of foaming catalysts and hence adversely affects the curing behavior.

The processes described have not become decisively established to date. When nitrogen-containing compounds are concomitantly used, the intrinsic reactivity of the polyetherols is noticeably increased in a manner undesirable for many applications and thus adversely affects the curing behavior of the rigid foams. The reaction of compounds having a high functionality, such as sucrose, with alkylene oxides in their own alkoxylates leads to polyetherols which have a high functionality and often contain unconverted sucrose.

Numerous processes for the preparation of polyetherols having a high functionality and based on sucrose use glycerol as a coinitiator. This proven procedure leads to polyetherols which meet most property requirements. However, they do not exhaust the possibilities of a higher effective functionality of sucrose polyetherols having improved curing behavior and formation of a highly dense network in the foam. The process presented in U.S. Pat. No. 5,143,941 for the preparation of energy-absorbing PUR foams uses, inter alia, a polyetherol based on sucrose/dipropylene glycol/propylene oxide having a hydroxyl number of about 400 mg KOH/g. In the case of this hydroxyl number, however, it is necessary to reduce the effective functionality to about 3.5, since the viscosity of the polyetherol would otherwise far exceed 10 Pa·s. Consequently the effect of a high network density and of good flow behavior is no longer obtained in the case of such polyols.

CA-A-2135352 describes the preparation of rigid foams having a good insulation effect in combination with good physical properties, good demoldability and K factors. The formulation contains, inter alia, a polyetherol based on sucrose/propylene glycol/water and propylene oxide and a polyetherol based on sucrose/propylene glycol/water and ethylene oxide and propylene oxide. Since excessively high viscosities are generally obtained by the combination of sucrose/propylene glycol and usual hydroxyl numbers for rigid foam applications and the water content reduces the functionality, the useability is subject to limits.

For the use of sucrose polyetherols having a high functionality which possess advantageous processing viscosities, give rise to improved flow behavior or contribute towards sufficiently high network density in the foam and are light in color, novel possibilities are being sought for improving the properties of the foam itself and its processing, such as curing behavior, demolding of the foams, mechanical properties, insulation behavior and heat stability and for ensuring economically advantageous use of the raw materials.

It is an object of the present invention to provide, for rigid PUR foams having high network density and good mechanical properties, polyetherols which, with a large number of functional groups and relatively low viscosity, excellent properties and good thermal stability, can be reacted with polyisocyanates and conventional additives to give PUR foams. It is intended to use economical raw materials and technologies and to achieve a high property level for use in rigid industrial foams for sandwich, refrigerator and district heating applications.

We have found that this object is achieved, according to the invention, if an initiator combination having diols carrying ethoxy structures is used for the preparation of the polyetherols, the ratio of the mean number of hydroxyl groups per mole of initiator combination to the number of ethoxy structures in the polyetherol being from 1:0.2 to 1:1.8 and the ratio of the amounts by weight of the dials carrying ethoxy structures to the mean molecular weight of the polyetherol being from 1:2 to 1:15.

The present invention thus relates to a process for the preparation of polyetherols based on solid initiator substances and liquid, hydroxyl-containing coinitiators by a catalyzed addition reaction of alkylene oxides, wherein the initiator combination contains diols carrying ethoxy structures, the ratio of the average number of hydroxyl groups per mole of initiator combination to the number of ethoxy structures in the polyetherol being from 1:0.2 to 1:1.8 and the ratio of the amounts by weight of the dials carrying ethoxy structures to the average molecular weight of the polyetherol being from 1:2 to 1:15.

Rigid PUR foams having good properties are obtained with the use of polyetherols based on sucrose-diol or diol/triol having ethoxy groups. It was found that the effective functionality of the polyetherols, with identical average functionality of the initiator mixtures, based on the average number of functional groups per mole, is highest when the difference between the numbers of the hydroxyl groups of the substances in the initiator mixture likewise reaches or closely approaches its highest possible value.

It was found, surprisingly, that the use of ethoxy structures in addition to, for example, sucrose in the initiator mixture influences the polyetherol properties more greatly than expected. Thus, it was primarily possible to improve the curing behavior and the flowability substantially. An unexpectedly large effect was found in particular when ethoxy structures are present both in the initiator mixture and in the chain structure. This combination enhances in particular the reduction in the viscosity of the polyetherol mixture as well as substantially improving the flow behavior during foaming.

According to the invention, the solid initiator substance used is preferably sucrose. However, it is also possible to use, for example, sorbitol and, if required, pentaerythritol.

In the case of solid initiators, the presence of liquid, hydroxyl-containing coinitiators is necessary in order to take up the solid, thoroughly mix it and alkoxylate it.

According to the invention, diols carrying ethoxy structures and/or their di- and/or tricondensates are used as coinitiators. Advantageously used coinitiators are ethylene glycols. Mono-, di- and triethylene glycol and any desired mixtures thereof are suitable.

If required, water is used in addition to said coinitiators.

The content of solid initiators in the initiator mixture is preferably from 35 to 90, particularly preferably from 70 to 85, % by weight.

In addition to the novel ethoxy-carrying diols, if appropriate up to 10% by weight, based on the total weight of the coinitiators used, of further conventional coinitiators, for example propylene glycols and/or triols, such as glycerol and trimethylolpropane, may be present.

The functionality of the initiator mixture is preferably from 3.5 to 6, particularly preferably from 4 to 5.

For the preparation of the polyetherols, the mixture of solid initiator substances and liquid, hydroxyl-containing coinitiators is reacted with alkylene oxides.

Lower alkylene oxides, advantageously ethylene oxide, propylene oxide and/or butylene oxide, are preferably used for the alkoxylation reaction. The alkylene oxides are subjected to the addition reaction individually, in succession in blocks or in the form of random mixtures.

The reaction of the initiator mixture with propylene oxide alone or the formation of a low molecular weight propoxylate, which is subsequently reacted with defined amounts of ethylene oxide, is advantageous. Thereafter, further propylene oxide and/or butylene oxide can be added until the desired molecular weight of the polyetherols is reached.

Further advantageous process variants are the metering of an ethylene oxide-containing mixture of alkylene oxides and a further addition reaction of propylene oxide or butylene oxide as terminal block.

If ethylene oxide is used, its amount is advantageously up to 30, preferably from 10 to 15, mol %, based in each case on the molecular weight of the polyetherol.

The alkoxylation is carried out in a known manner, as explained, for example, further below. The reaction is effected in particular at from 80 to 140° C. and from 0.1 to 1.0 MPa and is anionically or cationically catalyzed, preferably with basic catalysts, such as amines or alkaline earth metal or alkali metal hydroxides. Potassium hydroxide is particularly preferably used as a catalyst.

In order to obtain polyetherols having the advantageous properties described above, according to the invention a ratio of the average number of hydroxyl groups per mole of initiator combination to the number of ethoxy structures in the polyetherol of from 1:0.2 to 1:1.8, preferably from 1:0.3 to 1:1.5, and a ratio of the amounts by weight of the diols carrying ethoxy structures to the average molecular weight of the polyetherol of from 1:2 to 1:15, preferably from 1:35 to 1:11, should be maintained.

If the number of ethoxy structures in the polyetherol is below these limits, the desired advantageous effects which the polyetherols have on curing behavior and flowability when used as components in the polyurethane system are no longer present. In the case of contents of ethoxy structures above said limits, primary OH groups are increasingly formed and the reactivity increases unintentionally.

The content of ethoxy structures results from the ethylene glycols in the initiator mixture but may be additionally increased by the use of ethylene oxide.

The content of ethoxy structures is also variable as a result of the possible use of condensed products of ethylene glycol, use up to the tricondensate being expedient.

After the end of the alkylene oxide addition reaction, the crude polyetherpolyol is separated from the catalyst in a known manner, for example by neutralization with an acid, distillation under reduced pressure and filtration.

The polyetherpolyols thus prepared can, if required, be further purified by conventional methods, for example extraction or sorption with solid sorbents or extracting agents, although this is not necessary for achieving the object of the invention.

The polyetherols prepared according to the invention have an OH number range of from 300 to 650 mg KOH/g. The advantageous properties are displayed in particular in the OH number range from 380 to 520 mg KOH/g, so that these products are preferred for use in practice.

They have a functionality of from 3.5 to 6. Owing to the high functionalities achievable in the case of the novel polyetherols, an important precondition for the formation of highly crosslinked rigid foams having good mechanical stability, and owing to well balanced flow and curing behavior, these products are very useful for the preparation of industrial rigid PUR foams.

The preparation of the PUR, in particular rigid PUR foams, is effected in the usual manner by reacting the polyetherols prepared according to the invention, if required as a mixture with further higher molecular weight compounds having at least two reactive hydrogen atoms, with organic and/or modified organic polyisocyanates and, if required, low molecular weight chain extenders and/or crosslinking agents in the presence of blowing agents, catalysts and, if required, further assistants and/or additives.

Regarding the starting components known per se which may be used, it may be stated specifically:

Suitable organic and/or modified organic polyisocyanates are the aliphatic or cycloaliphatic, araliphatic and preferably aromatic polyfunctional isocyanates known per se.

Specific examples of alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate, cycloaliphatic diisocyanates, such as cyclohexane 1,3- and 1,4-diisocyanate and any desired mixtures of these isomers, 1-isocyanato-3,3,5-trimethyl-5-isocyanatomethylcyclohexane (IPDI), hexahydrotolylene 2,4- and 2,6-diisocyanate and the corresponding isomer mixtures, dicyclohexylmethane 4,4'-, 2,2'- and 2,4'-diisocyanate and the corresponding isomer mixtures, and preferably aromatic di- and polyisocyanates, e.g. tolylene 2,4- and 2,6-diisocyanate and the corresponding isomer mixtures, diphenylmethane 4,4'-, 2,4'- and 2,2'-diisocyanate and the corresponding isomer mixtures, polyphenylpolymethylene polyisocyanates, mixtures of diphenylmethane 4,4'-, 2,4'- and 2,2'-diisocyanates and polyphenylpolymethylene polyisocyanates (crude MDI) and mixtures of crude MDI and tolylene diisocyanates. The organic di- and polyisocyanates can be used individually or in the form of their mixtures.

Frequently, modified polyfunctional isocyanates, i.e. products which are obtained by chemical reaction of organic di- and/or polyisocyanates, are also used. Examples are di- and/or polyisocyanates containing ester, urea, biuret, allophanate, carbodiimide, isocyanurate, uretdione and/or urethane groups. The modified polyisocyanates can be mixed with one another or with unmodified organic polyisocyanates, e.g. diphenylmethane 2,4'-diisocyanate, diphenylmethane 4,4'-diisocyanate, crude MDI, tolylene 2,4-diisocyanate and/or tolylene 2,6-diisocyanate.

In addition to the novel polyetherpolyols described above, further compounds having hydrogen atoms reactive toward isocyanates can, if required, be used.

Compounds having at least two reactive hydrogen atoms are primarily used for this purpose. Expediently, those having a functionality of from 2 to 8, preferably from 2 to 6, and a molecular weight of from 300 to 8000, preferably from 300 to 3000, are used. Use depends on the desired properties of the rigid PUR foam to be prepared.

For example, it is possible to use further polyols selected from the group consisting of polyetherpolyols, polyesterpolyols, polythioetherpolyols, polyesteramides, hydroxyl-containing polyacetals and hydroxyl-containing aliphatic polycarbonates, or mixtures of at least two of said polyols. The hydroxyl number of the polyhydroxy compounds is as a rule from 150 to 850, preferably from 200 to 600, mg KOH/g. For example, polyether polyamines may also be used.

The polyetherpolyols used are prepared by known processes, for example by anionic polymerization with alkali metal hydroxides, e.g. sodium hydroxide or potassium hydroxide, or alkali metal alcoholates, e.g. sodium methylate, sodium ethylate, potassium ethylate or potassium isopropylate, as catalysts and with the addition of at least one initiator which contains from 2 to 8, preferably from 2 to 6, bonded reactive hydrogens per molecule, or by cationic polymerization with Lewis acids, such as antimony pentachloride, boron fluoride etherate, etc., or bleaching earths as catalysts, from one or more alkylene oxides having 2 to 4 carbon atoms in the alkylene radical.

Other suitable polyetherpolyols are polymer-modified polyetherpolyols, preferably graft polyetherpolyols, in particular those based on styrene and/or acrylonitrile, which are prepared by in situ polymerization of acrylonitrile, styrene or preferably mixtures of styrene and acrylonitrile, for example in the weight ratio of from 90:10 to 10:90, preferably from 70:30 to 30:70, expediently in the abovementioned polyetherpolyols, analogously to the data of German patents 1111394, 1222669 (U.S. Pat. Nos. 3,304,273, 3,383, 351, 3,523,093), 1152536 (GB 1040452) and 1152537 (GB 987618), and polyetherpolyol dispersions which contain, as the disperse phase, usually in an amount of from 1 to 50, preferably from 2 to 25, % by weight, for example polyureas, polyhydrazides, polyurethanes containing bonded tert-amino groups and/or melamine and which are described, for example, in EP-B-011752 (U.S. Pat. No. 4,304,708), U.S. Pat. No. 4,374,209 and DE-A-3231497.

If, in addition to the novel polyetherols, further higher molecular weight compounds having at least two reactive hydrogen atoms are used, the proportion of the novel polyetherpolyols should be at least 25% by weight. Advantageously, from 30 to 70% by weight of novel polyetherpolyols are used, based in each case on the total weight of the higher molecular weight compounds having at least two reactive hydrogen atoms.

The PUR, in particular rigid PUR foams, can be prepared with or without the use of chain extenders and/or crosslinking agents, although these are not generally required. The chain extenders and/or crosslinking agents used are diols and/or triols having molecular weights of less than 400, preferably from 60 to 300. For example, aliphatic, cycloaliphatic and/or araliphatic diols of 2 to 14, preferably 4 to 10, carbon atoms, e.g. ethylene glycol, 1,3-propanediol, 1,10-decanediol, o-, m- and p-dihydroxycyclohexane, diethylene glycol, dipropylene glycol and preferably 1,4-butanediol, 1,6-hexanediol and bis(2-hydroxyethyl) hydroquinone, triols, such as 1,2,4- and 1,3,5-trihydroxycyclohexane, triethanolamine, diethanolamine, glycerol and trimethylolpropane, and low molecular weight hydroxyl-containing polyalkylene oxides based on ethylene oxide and/or 1,2-propylene oxide and the abovementioned diols and/or triols as initiator molecules are suitable.

If chain extenders, crosslinking agents or mixtures thereof are used, they are expediently used in an amount of up to 20, preferably from 1 to 10, % by weight, based in each case on the weight of the compounds having at least two reactive hydrogen atoms which are used.

For the preparation of PUR foams, blowing agents are usually used. The blowing agent used in particular is water, which eliminates carbon dioxide as a result of the reaction with the isocyanate groups. The water content is preferably from 0.1 to 4, in particular from 0.3 to 3, % by weight, based on the weight of the compounds having at least two reactive hydrogen atoms which are used.

Water may be added in combination with the use of physical blowing agents.

The physical blowing agents used may be the chlorofluorocarbons (CFCs) generally known from polyurethane chemistry and highly fluorinated and/or perfluorinated hydrocarbons. However, the use of these substances is greatly restricted or has been completely discontinued for ecological reasons. In addition to chlorofluorohydrocarbons and fluorohydrocarbons, in particular aliphatic and/or cycloaliphatic hydrocarbons are possible as alternative blowing agents. In particular, low-boiling hydrocarbons, lower monofunctional alcohols and acetals, e.g. methylal, are used. Low-boiling cyclic and acyclic saturated hydrocarbons of up to 12 carbon atoms are preferred and can be used individually or as any desired mixtures with one another. In particular, pentanes are used, it being possible to use both mixtures of the pentane isomers and the pure isomers. Owing to the particularly low thermal conductivities, cyclopentane is particularly preferably used. These physical blowing agents are usually added to the polyol component of the system. However, they can also be added to the isocyanate component or both to the polyol component and to the isocyanate component as a combination. The amount of the physical blowing agent used or of the blowing agent mixture is from 1 to 30, preferably from 5 to 20, % by weight, based in each case on the weight of the A component defined further below.

Further assistants and/or additives are incorporated into the reaction mixture for the preparation of the PUR. Examples are catalysts and, if required, surfactants, foam stabilizers, cell regulators, fillers, dyes, pigments, flameproofing agents, hydrolysis stabilizers and fungistatic and bacteriostatic substances.

For the preparation of the PUR, in particular rigid PUR foams, the organic and/or modified organic polyisocyanates, the novel polyetherpolyols and, if required, further compounds having hydrogen atoms reactive toward isocyanates are reacted in amounts such that the ratio of the number of equivalents of NCO groups of the polyisocyanates to the sum of the reactive hydrogen atoms of the novel polyetherpolyols and any further compounds having hydrogen atoms reactive toward isocyanates is from 0.85:1 to 1.25:1, preferably from 0.95:1 to 1.15:1, in particular from 1:1 to 1.05:1. If the rigid PUR foams contain at least some of the isocyanurate groups in bonded form, the ratio of NCO groups of the polyisocyanates to the sum of the reactive hydrogen atoms of from 1.5:1 to 60:1, preferably from 1.5:1 to 8:1, is usually used.

It has proven particularly advantageous to employ the two-component process and to combine the components (polyetherpolyols prepared according to the invention, any higher molecular weight compounds having at least two reactive hydrogen atoms which are present, any low molecular weight chain extenders and/or crosslinking agents which are present, blowing agents, catalysts and any further assistants and/or additives) into a polyol component, often also referred to as component A, and to use the organic and/or modified organic polyisocyanates and any blowing agent as the isocyanate component, often also referred to as component B.

Further information about the abovementioned and further starting materials and about the PUR preparation is to be found in the technical literature, for example the monograph by J. H. Saunders and K. C. Frisch, "High Polymers", Volume XVI, Polyurethanes, Parts 1 and 2, Interscience Publishers 1962 and 1964, or the above-cited Kunststoffhandbuch, Polyurethane, Volume VII, Hanser-Verlag Munich, Vienna, $1^{st}$ to $3^{rd}$ Editions.

The use of the novel polyetherols in rigid foam systems leads to excellent curing and surprisingly large improvement in the flowability during foaming, with the result that application advantages are achievable in the industrial rigid foam, in particular in the district heating application and in refrigeration, but also in the case of support and design materials in the furniture sector and in construction parts in the automotive sector.

The rigid PUR foams prepared using the novel polyetherols have a density of from 0.02 to 0.30, preferably from 0.025 to 0.24, in particular from 0.03 to 0.1, $g/cm^3$.

The examples which follow illustrate the invention but without imposing a corresponding restriction.

EXAMPLE 1

(Comparison)

325 g of triethanolamine and 7 g of 45% strength potassium hydroxide solution were initially taken into a 2l autoclave having a stirrer, a temperature and pressure measurement means and heating and cooling, and 320 g of sucrose were added while stirring. The mixture was then heated to 110° C. 1135 g of propylene oxide were then metered in at a reaction temperature of from 110 to 115° C. and a pressure of from 4 to 6 bar. After a subsequent reaction for 2 hours at 110° C., the crude polyetherol was cooled, hydrolyzed with water, neutralized with phosphoric acid and then subjected to distillation under reduced pressure and filtered.

The polyetherol obtained had the following characteristics:

| OH number | 432 mg KOH/g |
|---|---|
| Viscosity at 25° C. | 7600 mPa · s |
| pH | 10.0 |
| Water content | 0.04% by weight. |

EXAMPLE 2

(Comparison)

135 g of ethanolamine and 9 g of 45% strength potassium hydroxide solution were initially taken in an autoclave according to Example 1, and 320 g of sucrose were added while stirring. The mixture was then heated to 110° C. 1325 g of propylene oxide were then metered in at a reaction temperature of from 110 to 115° C. and a pressure of from 4 to 6 bar. After a subsequent reaction for 2 hours at 110° C., the crude polyetherol was cooled, hydrolyzed with water, neutralized with phosphoric acid and then subjected to distillation under reduced pressure and filtered.

The polyetherol obtained had the following characteristics:

| OH number | 437 mg KOH/g |
|---|---|
| Viscosity at 25° C. | 7750 mPa · s |
| pH | 10.4 |
| Water content | 0.04% by weight. |

EXAMPLE 3

(Comparison)

225 g of glycerol and 9 g of 45% strength potassium hydroxide solution were initially taken in an autoclave according to Example 1, and 360 g of sucrose were added while stirring. The mixture was then heated to 110° C. 1215 g of propylene oxide were then metered in at a reaction temperature of from 110 to 115° C. and a pressure of from 3 to 6 bar. After a subsequent reaction for 2 hours at 110° C., the crude polyetherol was cooled, hydrolyzed with water, neutralized with phosphoric acid and then subjected to distillation under reduced pressure and filtered.

The polyetherol obtained had the following characteristics:

| OH number | 493 mg KOH/g |
|---|---|
| Viscosity at 25° C. | 8490 mPa · s |
| pH | 8.3 |
| Water content | 0.02% by weight. |

EXAMPLE 4

(According to the Invention)

180 g of diethylene glycol and 9 g of 45% strength potassium hydroxide solution were initially taken in an autoclave according to Example 1, and 480 g of sucrose were added while stirring. The mixture was then heated to 110° C. 1125 g of propylene oxide were then metered in at a reaction temperature of from 110 to 115° C. and a pressure of from 4 to 6 bar. After a subsequent reaction for 2 hours at 110° C., the crude polyetherol was cooled, hydrolyzed with water, neutralized with phosphoric acid and then subjected to distillation under reduced pressure and filtered.

The polyetherol obtained had a ratio of the average number of hydroxyl groups per mole of initiator combination to the number of ethoxy structures in the polyetherol of 1:0.5 and a ratio of the amounts by weight of the ethoxy structures to the average molecular weight of the polyetherol of 1:6.8.

The following characteristics were determined:

| OH number | 435 mg KOH/g |
|---|---|
| Viscosity at 25° C. | 5660 mPa · s |
| pH | 8.6 |
| Water content | 0.071% by weight. |

EXAMPLE 5

(According to the Invention)

180 g of diethylene glycol and 9.5 g of 45% strength potassium hydroxide solution were initially taken in an autoclave according to Example 1, and 480 g of sucrose were added while stirring. The mixture was then heated to 110° C. 270 g of ethylene oxide were then added at a reaction temperature of from 105 to 110° C. and a pressure of from 4 to 6 bar. After a subsequent reaction time of 1 hour at 110° C., 830 g of propylene oxide were metered in at a reaction temperature of from 110 to 115° C. and a pressure of from 3 to 6 bar. After a subsequent reaction for 2 hours at 110° C., the crude polyetherol was cooled, hydrolyzed with water, neutralized with phosphoric acid and then subjected to distillation under reduced pressure and filtered.

The polyetherol obtained had a ratio of the average number of hydroxyl groups per mole of initiator combination to the number of ethoxy structures in the polyetherol of 1:1.4 and a ratio of the amounts by weight of the ethoxy structures to the average molecular weight of the polyetherol of 1:2.

The following characteristics were determined:

| OH number | 402 mg KOH/g |
|---|---|
| Viscosity at 25° C. | 2050 mPa · s |
| pH | 8.02 |
| Water content | 0.03% by weight. |

EXAMPLE 6

(According to the Invention)

127 g of monoethylene glycol and 9 g of 45% strength potassium hydroxide solution were initially taken in an autoclave according to Example 1, and 480 g of sucrose were added while stirring. The mixture was then heated to 110° C. 1175 g of propylene oxide were then metered in at a reaction temperature of from 110 to 115° C. and a pressure of from 3 to 6 bar. After a subsequent reaction for 2 hours at 110° C., the crude polyetherol was cooled, hydrolyzed with water, neutralized with phosphoric acid and then subjected to distillation under reduced pressure and filtered.

The polyetherol obtained had a ratio of the average number of hydroxyl groups per mole of initiator combination to the number of ethoxy structures in the polyetherol of 1:0.5 and a ratio of the amounts by weight of the ethoxy structures to the average molecular weight of the polyetherol of 1:5.6.

The following characteristics were determined:

| OH number | 491 mg KOH/g |
|---|---|
| Viscosity at 25° C. | 12080 mPa · s |
| pH | 7.85 |
| Water content | 0.03% by weight. |

EXAMPLE 7

(According to the Invention)

307 g of triethylene glycol and 8 g of 45% strength potassium hydroxide solution were initially taken in an autoclave according to Example 1, and 500 g of sucrose were added while stirring. The mixture was then heated to 110° C. 1000 g of propylene oxide were then metered in at a reaction temperature of from 110 to 115° C. and a pressure of from 3 to 6 bar. After a subsequent reaction for 2 hours at 110° C., the crude polyetherol was cooled, hydrolyzed with water, neutralized with phosphoric acid and then subjected to distillation under reduced pressure and filtered.

The polyetherol obtained had a ratio of the average number of hydroxyl groups per mole of initiator combination to the number of ethoxy structures in the polyetherol of 1:0.9 and a ratio of the amounts by weight of the ethoxy structures to the average molecular weight of the polyetherol of 1:4.

The following characteristics were determined:

| | |
|---|---|
| OH number | 481 mg KOH/g |
| Viscosity at 25° C. | 9570 mPa · s |
| pH | 9.71 |
| Water content | 0.03% by weight. |

EXAMPLE 8

(According to the Invention)

190 g of diethylene glycol and 8.5 g of 45% strength potassium hydroxide solution were initially taken in an autoclave according to Example 1, and 440 g of sucrose were added while stirring. The mixture was then heated to 110° C. 450 g of propylene oxide were then added at a reaction temperature of from 110 to 115° C. and a pressure of from 3 to 6 bar. After a subsequent reaction for 2 hours at 110° C., this prepolymer having the following characteristics:

| | |
|---|---|
| Viscosity at 75° C. | about 1000 mPa · s |
| Total alkalinity | about 0.34% of KOH | was reacted with a further 690 g of propylene oxide. The crude polyetherol was cooled, hydrolyzed with water, neutralized with phosphoric acid and then subjected to distillation under reduced pressure and filtered.

The polyetherol obtained had a ratio of the average number of hydroxyl groups per mole of initiator combination to the number of ethoxy structures in the polyetherol of 1:0.8 and a ratio of the amounts by weight of the ethoxy structures to the average molecular weight of the polyetherol of 1:3.6.

The following characteristics were determined:

| | |
|---|---|
| OH number | 442 mg KOH/g |
| Viscosity at 25° C. | 6520 mPa · s |
| pH | 7.96 |
| Water content | 0.01% by weight. |

(The prepolymer was capable of being stored and could be used as a starting material for further final syntheses in the main reactor.)

EXAMPLE 9

(According to the Invention)

176 g of diethylene glycol and 10 g of 45% strength potassium hydroxide solution were initially taken in an autoclave according to Example 1, and 406 g of sucrose were added while stirring. The mixture was then heated to 110° C. 230 g of ethylene oxide and 450 g of propylene oxide, as a mixture, were then metered in at a reaction temperature of from 110 to 115° C. and a pressure of from 3 to 6 bar. After a subsequent reaction for one hour at 115° C., a further 530 g of propylene oxide were added. After a subsequent reaction for 2 hours at 110° C., the crude polyetherol was cooled, hydrolyzed with water, neutralized with phosphoric acid and then subjected to distillation under reduced pressure and filtered.

The polyetherol obtained had a ratio of the average number of hydroxyl groups per mole of initiator combination to the number of ethoxy structures in the polyetherol of 1:1.6 and a ratio of the amounts by weight of the ethoxy structures to the average molecular weight of the polyetherol of 1:2.

The following characteristics were determined:

| | |
|---|---|
| OH number | 404 mg KOH/g |
| Viscosity at 25° C. | 2280 mPa · s |
| pH | 8.95 |
| Water content | 0.02% by weight. |

EXAMPLE 10

(Comparison)

A polyol component consisting of
- 54 parts by mass (pbm) of a polyetherol according to Example 1, having an OH number of 432 mg KOH/g,
- 4.2 pbm of glycerol,
- 21.1 pbm of a polyetherol based on monoethylene glycol and propylene oxide, OH number of 105 mg KOH/g,
- 1 pbm of silicone stabilizer B 8409 (from Goldschmidt),
- 1.8 pbm of dimethylcyclohexylamine,
- 2.4 pbm of water and
- 15.5 pbm of R 141 b, was thoroughly mixed with 125 pbm of crude MDI, NCO content 31.5% by mass (characteristic 110).

When subjected to free-rising foaming in the foam beaker, the resulting foam had a density of 29.2 kg/m$^3$

EXAMPLE 11

(Comparison)

A polyol component according to Example 10, but which contained 54 parts by mass (pbm) of a polyetherol according to Example 2, having an OH number of 437 mg KOH/g (instead of the polyetherol according to Example 1), was thoroughly mixed with 125 pbm of crude MDI, NCO content 31.5% by mass (characteristic 110).

The resulting foam had a density of 30.0 kg/m$^3$.

EXAMPLE 12

(Comparison)

A polyol component according to Example 10, but which contained 54 parts by mass (pbm) of a polyetherol according to Example 3, having an OH number of 493 mg KOH/g (instead of the polyetherol according to Example 1), was thoroughly mixed with 125 pbm of crude MDI, NCO content 31.5% by mass (characteristic 110).

The resulting foam had a density of 30.5 kg/m$^3$.

EXAMPLE 13

(According to the Invention)

A polyol component according to Example 10, but which contained 54 parts by mass (pbm) of a polyetherol according to Example 4, having an OH number of 435 mg KOH/g (instead of the polyetherol according to Example 1), was thoroughly mixed with 125 pbm of crude MDI, NCO content 31.5% by mass (characteristic 110).

The resulting foam had a density of 31.0 kg/m$^3$.

EXAMPLE 14

(According to the Invention)

A polyol component according to Example 10, but which contained 54 parts by mass (pbm) of a polyetherol according to Example 5, having an OH number of 422 mg KOH/g (instead of the polyetherol according to Example 1), was thoroughly mixed with 125 pbm of crude MDI, NCO content 31.5% by mass (characteristic 110).

The resulting foam had a density of 30.2 kg/M$^3$.

EXAMPLE 15

(According to the Invention)

A polyol component according to Example 10, but which contained 54 parts by mass (pbm) of a polyetherol according to Example 6, having an OH number of 491 mg KOH/g (instead of the polyetherol according to Example 1), was thoroughly mixed with 125 pbm of crude MDI, NCO content 31.5% by mass (characteristic 110).

The resulting foam had a density of 31.5 kg/m$^3$.

EXAMPLE 16

(According to the Invention)

A polyol component according to Example 10, but which contained 54 parts by mass (pbm) of a polyetherol according to Example 7, having an OH number of 481 mg KOH/g (instead of the polyetherol according to Example 1), was thoroughly mixed with 125 pbm of crude MDI, NCO content 31.5% by mass (characteristic 110).

The resulting foam had a density of 31.0 kg/m$^3$.

EXAMPLE 17

(According to the Invention)

A polyol component according to Example 10, but which contained 54 parts by mass (pbm) of a polyetherol according to Example 8, having an OH number of 442 mg KOH/g (instead of the polyetherol according to Example 1), was thoroughly mixed with 125 pbm of crude MDI, NCO content 31.5% by mass (characteristic 110).

The resulting foam had a density of 30.0 kg/m$^3$.

EXAMPLE 18

(According to the Invention)

A polyol component according to Example 10, but which contained 54 parts by mass (pbm) of a polyetherol according to Example 9, having an OH number of 404 mg KOH/g (instead of the polyetherol according to Example 1), was thoroughly mixed with 125 pbm of crude MDI, NCO content 31.5% by mass (characteristic 110).

The resulting foam had a density of 29.5 kg/m$^3$.

The foams obtained were investigated by means of the bolt test with respect to their curing and by means of the tube test with respect to their flowability.

Bolt Test

Using a standardized bolt of 20 mm diameter, the force of penetration into the foam is measured at specific time intervals after preparation. The bolt penetrates 10 mm into the foam.

Tube Test

Immediately after mixing of the components, 100 g of reacting mixture are poured into a continuous tube comprising a plastics film having a diameter of 4.5 cm. The tube is then clamped off and the foam length achieved is taken as a measure of the flowability.

The results obtained are shown in Table 1.

TABLE 1

| | Example | | | | | | | | |
|---|---|---|---|---|---|---|---|---|---|
| | 10 | 11 | 12 | 13 | 14 | 15 | 16 | 17 | 18 |
| Force of penetration (N) | | | | | | | | | |
| after 3 min | 13 | 10 | 15 | 28 | 30 | 25 | 28 | 30 | 35 |
| after 5 min | 40 | 35 | 42 | 60 | 61 | 55 | 58 | 62 | 65 |
| Foam length (cm) | 150 | 145 | 153 | 170 | 165 | 160 | 163 | 165 | 172 |

The rigid PUR foams based on the novel polyols exhibited better curing and better flow behavior compared with those based on the comparative polyols.

We claim:

1. A process for the preparation of polyetherols, wherein a combination of solid initiator substances and liquid hydroxy-containing coinitiators are used, which process comprises a catalyzed addition reaction of alkylene oxides using said initiator combination, wherein the initiator combination contains diols carrying ethoxy structures, the ratio of the average number of hydroxyl groups per mole of initiator combination to the number of ethoxy structures in the polyetherol being from 1:0.2 to 1:1.8 and the ratio of the amounts by weight of the diols carrying ethoxy structures to the average molecular weight of the polyetherol being from 1:2 to 1:15.

2. A process as claimed in claim 1, wherein the coinitiators used are diols and/or their di- and/or tricondensates.

3. A process as claimed in claim 1, wherein the coinitiators are used in combination with water.

4. A process as claimed in claim 1, wherein the coinitiator used is ethylene glycol.

5. A process as claimed in claim 1, wherein the content of solid initiator substances in the initiator mixture is from 35 to 90% by weight.

6. A process as claimed in claim 1, wherein the functionality of the initiator mixture is from 3.5 to 6.

7. A process as claimed in claim 1, wherein the solid initiator substance used is sucrose.

8. A method of producing a polyurethane comprising reacting:
   a) a polyetherol prepared according to a process as claimed in claim 1, 2, 3, 4, 5, 6, or 7, and optionally, further compounds having at least two hydrogen atoms reactive toward isocyanates;
   b) an organic and/or modified organic polyisocyanate; and
   c) optionally chain extenders and/or cross-linking agents;
   d) in the presence of
   e) if desired, a catalyst, a blowing agent, and
   f) optionally, further assistants and/or additives.

* * * * *